United States Patent [19]

Dobreski et al.

[11] Patent Number: 4,820,589

[45] Date of Patent: Apr. 11, 1989

[54] CLING/NO CLING-SLIP STRETCH WRAP FILM

[75] Inventors: David V. Dobreski, Fairport; Robert J. Metz, Rochester, both of N.Y.; James Morris, Bertrange, Luxembourg

[73] Assignee: Mobil Oil Corporation, New York, N.Y.

[21] Appl. No.: 205,045

[22] Filed: Jun. 1, 1988

Related U.S. Application Data

[63] Continuation of Ser. No. 931,315, Nov. 17, 1986, abandoned.

[51] Int. Cl.⁴ .............. B32B 27/08; B32B 27/32; B32B 27/34
[52] U.S. Cl. .................. 428/422; 428/474.4; 428/475.5; 428/476.1; 428/516; 428/520
[58] Field of Search .............. 428/520, 319.9, 474.4, 428/463, 336, 422, 475.5, 476.1, 516; 526/348.6; 206/597

[56] References Cited

U.S. PATENT DOCUMENTS

| | | | |
|---|---|---|---|
| 3,501,363 | 3/1970 | Kirkpatrick | 428/463 X |
| 3,986,611 | 10/1976 | Dreher | 206/597 |
| 4,076,698 | 2/1978 | Anderson et al. | 526/348.6 |
| 4,136,203 | 1/1979 | Murphy et al. | 428/319.9 |
| 4,205,021 | 5/1980 | Morita et al. | 526/348.6 |
| 4,234,647 | 11/1980 | Murphy et al. | 428/319.9 X |
| 4,348,455 | 9/1982 | Clayton | 428/336 |
| 4,367,256 | 1/1983 | Biel | 428/520 X |
| 4,399,180 | 8/1983 | Briggs et al. | 428/523 X |
| 4,518,654 | 5/1985 | Eichbauer et al. | 428/520 |

Primary Examiner—Thomas J. Herbert
Attorney, Agent, or Firm—Alexander J. McKillop; Charles J. Speciale; James P. O'Sullivan, Sr.

[57] ABSTRACT

A stretch wrap film having one-sided cling of a thermoplastic A/B layer film structure wherein layer A in its stretched condition has a comparatively high cling force to layer B and layer B has at least substantially no cling force to a layer of itself and has a slide property when layer B is in contact with a layer of itself with relative motion therebetween and the surface of layer B presents sufficient area of an organic polymer which of its very nature causes the no cling force and the slide property.

12 Claims, No Drawings

CLING/NO CLING-SLIP STRETCH WRAP FILM

This is a continuation of copending application Ser. No. 931,315, filed on Nov. 17, 1986, now abandoned.

The present invention is concerned with a stretch wrap film and, in particular, with a stretch wrap film suitable for wrapping applications where the film has one surface with a high degree of cling and the other surface has no cling to itself and a slide property when its surfaces are in contact with relative motion therebetween.

The use of thermoplastic stretch wrap for the overwrap packaging of goods, and in particular, the unitizing of pallet loads, is currently a commercially developing end use. This is particularly true for polyethylene stretch films generically. There are a variety of overwrapping techniques which are employed utilizing such stretch wrap films, including automatic or manual wrapping of pallet loads. As the stretch wrap film is laid on about the girth of a pallet load, e.g., from a continuous roll, either the pallet load is rotated on a platform or if applied manually the film is walked around the pallet until all sides are covered, terminating in some extent of overlap. Braking tension is applied to the continuous roll of film so that the film is being continuously stretched in a controlled manner automatically or manually. Usually the stretch wrap film is located adjacent to the pallet load and vertical to the sides thereof. At the completion of the overwrap operation, the film is cut and attached to the previous layer of film either by virtue of its own tack adhesion or by employing some other adhesive means.

It is known in the art to include cling additives in order to impart an increased cling force between two contacting film surfaces. Examples of such cling additives are disclosed in U.S. Pat. No. 4,518,654, the disclosure of which is in its entirety incorporated herein by reference.

The incorporation of such cling agents in a stretch wrap film employed for the unitization of pallet loads presents a serious and expensive problem. While the employment of such a cling modified stretch wrap film will enhance and strengthen the bonding of the overlap film after the load has been stabilized, there is a tendency for one stabilized load to cling or drag against an adjacent load causing transportation and handling problems. Because of the cling nature of the overwrap, one such overlapped pallet load will not slide against an adjacent load. The tendency is for one load to pull destructively upon an adjacent load because of the cling nature of the film. Pallet loads are moved about by fork lift trucks and the forces involved break through the stretch wrap film and destroy the integrity of the overwrapped load. The above identified patent broadly describes a technique for overcoming this problem.

It is an object of the present invention to identify other more specific ways in which to overcome the problem in an effective and economical manner.

SUMMARY OF THE INVENTION

In accordance with the present invention, in a stretch wrap film having one-sided cling comprising a thermoplastic AB layer film structure wherein the surface of A, in its stretched condition, has a comparatively high cling force to the surface of B and the surface of B has no cling force to itself and has a slide property when the surface of B is in contact with itself with relative motion therebetween, the improvement comprising wherein the surface of B presents at least a sufficient area of an organic polymer which of its very nature causes said no cling force and said slide property.

The base polymer of layer A comprises a thermoplastic polymer which in film form does not possess a substantial cling force to a layer of itself. This layer is modified by means of a cling additive present in association with the base polymer at least in the surface thereof in an amount sufficient to maintain film A in its stretched condition, in cling contact with layer B. Layer B has at least its surface modified by an anti-cling proportion of an organic polymer which of its very nature causes no cling force to exist between a layer B surface and a layer B surface and has a slide property when the surface of B is in contact with itself with relative motion therebetween.

DETAILED DESCRIPTION OF THE INVENTION

The three important characteristics necessary for the subject film are (1) that it be a stretch film, (2) that one surface will cling to the opposite surface while in the stretched condition and (3) the opposite surface will not cling to itself and this surface will have a slide property in relation to a like surface with relative motion therebetween.

By stretch wrap film is meant any thermoplastic film which has a minimum stretch capability of about 50% and a maximum stretch of about 750%, more preferably, the film has a minimum stretch capability of 50% and typically has a maximum stretch of about 300-400%. As indicated, any thermoplastic film capable of being fashioned into a stretch wrap film is contemplated for use herein. This film can be modified by the inclusion therein or thereon of prior art cling additives for one side of the stretch wrap film. For the opposite side of the film, i.e. the no cling/slip side of the film, sufficient no cling/organic polymer may be in or on the surface of the film. It is to be understood that since the subject film must be a stretch film which has a cling aspect on one surface of the film and a no cling-slip aspect on the other surface of the film this can be accomplished either by coextrusion or by laminating two or more layers together. As long as the resulting film is a stretch wrap film having a cling and no cling-slip surfaces it is immaterial as to the number of film layers in between these two different types of surfaces.

The pallet unitizing techniques used in U.S. Pat. Nos. 3,986,611 and 4,050,221 are contemplated herein. The disclosures of these patents are incorporated herein in their entirety by reference.

Particularly preferred stretch wrap thermoplastic films suitable for use in the present invention are the polyolefins such as polyethylene, polypropylene, copolymers of ethylene and propylene, and polymers obtained from ethylene or propylene copolymerized with relatively minor amounts of other mono-olefinic monomers such as butene-1, isobutylene, acrylic acids, esters of acrylic acids, vinyl acetates, styrene and the like or combinations thereof. Preferred for the subject stretch wrap film is generically polyethylene, including high and low molecular weight polyethylene and copolymers thereof. Particularly preferred for the cling film portion of the stretch wrap film of the present invention is linear low density polyethylene (LLDPE). This material is a copolymer of ethylene with a $C_4$–$C_{10}$ olefin, for example, butene-1; 1,3-methyl-butene-1; 1,3- methyl-pentene-1; hexene-1; 4-methyl-penetene-1; 3-methyl-hexene-1; octene-1; decene-1 etc. The alpha-olefin is usually present in from 1-15 weight percent of the copolymer.

A typical manufacturing process for the formation thereof is disclosed in U.S. Pat. Nos. 4,076,698 and 4,205,021, the disclosures of which are in their entirety incorporated herein by reference. The preferred LLDPE (which can be very low density polyethylene) has a density ranging from about 0.890 to about 0.940 g/cc. This material preferably has a melt index of from about 0.4 to about 10. This material will constitute the base polymer of the A layer of the subject A/B structure.

While any thermoplastic film can be employed as the base layer which will present a noncling-slip surface, it is preferred that this layer also be a polyolefin. Thus, it can be of the above-identified LLDPE. In addition, the B layer can be fabricated from a low density polyethylene (LDPE) resin. This material will have a density ranging from about 0.890 to about 0.940 g/cc, and have a melt index ranging from about 0.4-10.

The cling side of the A/B film may contain any known cling agent in or on the A layer which will be effective in maintaining the A film in cling contact with the surface of the layer B while both are in the stretched condition. Nonlimiting examples of cling additives include, for example, polyisobutylene, having a number average molecular weight in the range of from about 1000-3000 grams per mole as measured by vapor phase osmometry. Other examples are amorphous, atactic, polypropylenes, e.g., number average molecular weight of 2000, the polyterpenes; mono- and di-glycerides of fatty acids and mixtures thereof as described in U.S. Pat. No. 3,048,263; amines and amides containing at least one ethylene oxide group, see U.S. Pat. Nos. 3,084,265 and 3,084,266.

The cling additive can be present in the A layer in any concentration which will permit the A surface to cling to the B surface or other surfaces, while in its stretched condition. A preferred concentration can range from about 0.1 to 10% by weight of the A layer.

In accordance with the present invention, the B layer must present a surface to which the A surface can cling, while at the same time present a surface which will not only not cling to itself but under the conditions of contacting, relative motion between B surfaces, a nondestructive slide or slip property will exist. A test of effectiveness can be demonstrated quite simply. Using the film of the present invention, two packages or pallet loads are wrapped with the B film surface presented outermost. When the two packages are contacted with sliding motion therebetween, the surfaces will tend to slip rather than destructively resisting slip.

The anti-cling polymer of the present invention is carried by or presented at the surface of any other thermoplastic base film which can be effectively employed as part of the stretch wrap film. Thus, the B layer is also a polyolefin, preferably generically polyethylene. This includes, high and low molecular weight polyethylene and copolymers thereof. Particularly preferred is a low density polyethylene (LDPE) or a linear low density polyethylene (LLDPE), as identified above.

To impart anti-cling and slip characteristics to the B layer there is interblended into it a second thermoplastic polymer which has sufficient surface-free energy so that it will cause contacting B surfaces, with relative motion therebetween, not to destructively cling together. Alternatively, the entire surface of B may be of this polymer. Examples of such polymers having comparatively low surface-free energies are the polyamides or nylons of commerce, for example, polycapramide, i.e. nylon 6, polyhexamethylene adipamide, i.e. nylon 66, polyhexamethylene sebacamide, i.e. nylon 610, the polyfluoro olefins, for example, polytetrafluoroethylene, polyvinylidene fluoride, etc. The amount of anti-cling/slip polymer present in the B layer is any amount which will provide slip between moving B surfaces. This amount can range from 0.1% to about 100% of the B layer.

In forming the subject stretch film, a convenient process is by coextruding the A and B layers. The A layer is preferably between 10% and 99.5% of the overall film thickness, and the B layer is between 90 and 0.5% of the overall film thickness.

In preparing the cling and noncling layers, it is contemplated to include therebetween any intermediate layer sufficient to prevent additive migration in either direction. For example, such a layer can be a layer of A without a cling additive or a layer of B without its anti-cling polymer material or any other barrier type thermoplastic resin. Further, the invention contemplates a multilayer film, with layers of other formulations between layers A and B.

In preparing the A/B extrudate of the present invention, any known prior art technique for coextruding the same can be employed. For example, the A formulation containing the appropriate amount of cling additive can be fed into the feed hopper of a conventional rotating screw extruder. The extruder screw employed can have a 6-inch diameter and a length to diameter ratio of about 24:1. A satellite extruder is employed for the coextrusion of the B composition containing the appropriate amount of the anti-cling/slip polymer. The satellite extruder comprises a conventional extruder having an extruder screw with a 3.5 inch diameter and a length to diameter ratio of about 24:1. Molten resin from the satellite extruder is fed into the cast film die affixed to the end of the A extruder through an adapter specifically designed to join the B polymer stream from the satellite extruder to the molten A polymer stream so that it effectively interfaces with the molten surface of the A layer. A more complete description of this prior art process may be found in U.S. Pat. No. 3,748,962, the disclosure of which is incorporated herein by reference.

While not intended to be bound by any theory of operation, it is believed that during the coextrusion of the A and B layers, a sufficient surface area of the anti-cling/slip polymer is presented at the surface of B such that during its stretched condition the effective surface free energy of B is reduced so that B surfaces cannot destructively interact when brought together under dynamic conditions.

EXAMPLE 1

Employing the above-described technique, an A/B coextrusion was formed composed of a 75% A layer thickness of a 3.0 MI, 0.917 g/cc density ethylene-hexene copolymer containing less than 10% by weight hexene (an LLDPE commercially available from Exxon Corporation identified as 300.55) containing polyisobutylene (Amoco H 300) in the ratio of 2 part per 98 parts of LLDPE; and a 25% B layer thickness of the same LLDPE containing nylon 66 (Celanese 1001). The nylon is present in a ratio of 15 parts to 85 parts of the LLDPE. The slot coextrudant film had a gauge of 0.9 mil at melt temperatures of approximately 560° F. (A layer) and 580° F. (B layer).

The surface of A had an excellent cling force to the surface of B while both were in the stretched condition, i.e. greater than 100% stretch. The dynamic coefficient of friction of the surfaces of B in relation to itself was excellent. There was no cling force and there was a slide property when the noncling surfaces were contacted with relative motion therebetween.

EXAMPLE 2

The procedure and structure of Example 1 was repeated except that the B layer was decreased to 10% of the thickness of the film. The same excellent characteristics were obtained.

EXAMPLE 3

A third stretch wrap film was prepared using the procedure and formulation of Example 1 except that the nylon 66 was not included in the 25% thickness, B layer and the A layer contain 1 part PIB to 99 parts LLDPE. While the surface of A had an effective cling to the surface of layer B under stretch wrap conditions, layer B could not by dynamically, i.e., slidingly, interfaced with a layer of itself without a destructive tearing result.

Although the Examples describe a cast film process for the manufacture of the present stretch film products, it will be understood that other conventional thermoplastic film forming techniques for the preparation of stretch wrap may be employed, such as, tubular extrusion utilizing an entrapped air bubble to expand the extruded film tube. The stretch wrap film of the present invention should have a minimum stretch capability of about 50% and typically will have a maximum stretch of about 300-400% under conditions employed for commercially wrapping pallets of loose loads.

It is to be understood that the foregoing description is merely illustrative of preferred embodiments of the invention, of which many variations may be made by those skilled in the art within the scope of the following claims without departing from the spirit thereof.

What is claimed is:

1. In a stretch wrap film having one-sided cling comprising a thermoplastic A/B layer film structure where, with the surfaces of A/B in their stretched condition, the A surface has a comparatively high cling force to the surface of B and the surface of B has no cling force to itself and has a slide property when the surface of B is in contact with itself with relative motion therebetween, the improvement comprising wherein the surface of B presents at least a sufficient area of another thermoplastic organic polymer of a member selected from the group consisting of a polyamide and a polyfluoro-olefin which of its very nature causes said no cling force and said slide property.

2. The film of claim 1 wherein said another organic polymer is a polyamide.

3. The film of claim 2 wherein said polyamide is present in said B layer in from 0.1% to 100% by weight.

4. The film of claim 2 wherein said polyamide is a nylon.

5. The film of claim 4 wherein said layer A and layer B comprise a polyolefin.

6. The film of claim 5 wherein said polyolefin is generically polyethylene.

7. The film of claim 6 wherein said polyethylene is a copolymer of ethylene and a $C_4$-$C_{10}$ alpha olefin.

8. The film of claim 1 wherein said another organic polymer is a polyfluoro-olefin.

9. The film of claim 8 wherein said polyfluoro-olefin is present in said B layer in from 0.1% to 100% by weight.

10. The film of claim 8 wherein said layer A and layer B comprise a polyolefin.

11. The film of claim 10 wherein said polyolefin is generically polyethylene.

12. The film of claim 11 wherein said polyethylene is a copolymer of ethylene and a $C_4$-$C_{10}$ alpha olefin.

* * * * *

UNITED STATES PATENT AND TRADEMARK OFFICE
CERTIFICATE OF CORRECTION

PATENT NO. : 4,820,589

DATED : April 11, 1989

INVENTOR(S) : David V. Dobreski et al

It is certified that error appears in the above-identified patent and that said Letters Patent is hereby corrected as shown below:

column 4, patent line 63: Should read --3003.55-- not "300.55".

Signed and Sealed this

Eighth Day of May, 1990

Attest:

HARRY F. MANBECK, JR.

*Attesting Officer*      *Commissioner of Patents and Trademarks*